(12) United States Patent
Suzuki et al.

(10) Patent No.: US 8,838,032 B2
(45) Date of Patent: *Sep. 16, 2014

(54) COMMUNICATION TERMINAL AND COMMUNICATION CONTROL METHOD

(75) Inventors: Toshiyuki Suzuki, Yokohama (JP); Mitsuru Murata, Yokohama (JP); Masaharu Nakatsuchi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 241 days.

This patent is subject to a terminal disclaimer.

(21) Appl. No.: 13/382,049

(22) PCT Filed: Jun. 30, 2010

(86) PCT No.: PCT/JP2010/061139
§ 371 (c)(1),
(2), (4) Date: Feb. 8, 2012

(87) PCT Pub. No.: WO2011/004745
PCT Pub. Date: Jan. 13, 2011

(65) Prior Publication Data
US 2012/0129454 A1 May 24, 2012

(30) Foreign Application Priority Data
Jul. 7, 2009 (JP) ................. 2009-160894

(51) Int. Cl.
*H04B 7/00* (2006.01)
*H04W 52/02* (2009.01)
*H04B 1/74* (2006.01)
*H04W 4/02* (2009.01)

(52) U.S. Cl.
CPC ............ *H04W 4/02* (2013.01); *H04W 52/0251* (2013.01); *H04B 1/74* (2013.01)
USPC ... 455/41.2; 455/41.1; 455/414.2; 340/539.1; 340/572.1

(58) Field of Classification Search
USPC ................. 455/41.1, 41.2, 414.2, 421, 550.1, 455/554.1; 340/539.1, 572.1, 686.2
See application file for complete search history.

(56) References Cited

U.S. PATENT DOCUMENTS 7,577,402 B2 * 8/2009 Fukuoka ....................... 455/41.2
2007/0216530 A1 9/2007 Fukuoka

FOREIGN PATENT DOCUMENTS

EP 1 732 293 A1 12/2006
JP 2003 032176 1/2003

(Continued)

OTHER PUBLICATIONS

International Search Report issued on Aug. 17, 2010 in PCT/JP2010/061139 filed on Jun. 30, 2010.
Japanese Notice of Reasons for Rejection issued Jun. 5, 2012, in Japan Patent Application No. 2009-160894 (with English translation).
Japanese Office Action issued Sep. 4, 2012, in Japan Patent Application No. 2009-160894 (with English translation).

(Continued)

Primary Examiner — Tuan H Nguyen
(74) Attorney, Agent, or Firm — Oblon, Spivak, McClelland, Maier & Neustadt, L.L.P.

(57) ABSTRACT

A communication terminal (10) including a first communication unit (11) and a second communication unit (12) includes a presence status detection unit (13) that detects a presence status indicating whether a distance from a personal computer (50) is inside a communication range where communication is possible or outside the communication range where communication is not possible for each of the first communication unit (11) and the second communication unit (12), and a communication status management unit (14) that, in accordance with the presence status of either communication unit (11, 12) detected by the presence status detection unit (13), causes the other communication unit (11, 12) to transition to an activation state, a standby state or a disconnection state.

2 Claims, 5 Drawing Sheets

(56) References Cited

FOREIGN PATENT DOCUMENTS

| | | |
|---|---|---|
| JP | 2008 066781 | 3/2008 |
| JP | 2009 135610 | 6/2009 |
| WO | 2005 094046 | 10/2005 |

OTHER PUBLICATIONS

International Preliminary Report on Patentability Issued Feb. 14, 2012 in PCT/JP10/61139 Filed Jun. 30, 2010.

Chinese Office Action issued Dec. 2, 2013, in China Patent Application No. 201080030366.3 (with English translation).

* cited by examiner

US 8,838,032 B2

COMMUNICATION TERMINAL AND COMMUNICATION CONTROL METHOD

TECHNICAL FIELD

The present invention relates to a communication terminal having a plurality of different communication means and a communication control method.

BACKGROUND ART

A communication terminal that is equipped with a plurality of different communication interfaces and conducts communications with the conjunction of the plurality of communication interfaces is hitherto known. For example, Patent Document 1 discloses a communication system in which a personal computer and a mobile telephone conduct communications using a contactless IC card and communications using Bluetooth (registered trademark). According thereto, when the mobile telephone comes close to the personal computer, communications using a contactless IC card are conducted between them, and the personal computer acquires a card ID of the contactless IC card from the mobile telephone. Then, based on the acquired card ID, the personal computer identifies the mobile telephone with which communications using Bluetooth are to be conducted, thereby establishing communication.

CITATION LIST

Patent Document

Patent Document 1: JP2003-32176A

SUMMARY OF INVENTION

Technical Problem

However, in the above-described hitherto known communication system, despite a difference in the communication distance of the plurality of communication interfaces, considerations such as activating or disconnecting another communication interface based on the communication distance are not taken into account. Therefore, in the case of separating communication terminals to disconnect communications from the state where the communications have been conducted simultaneously with two communication interfaces working in conjunction with each other, for example, the communication interface with a longer communication distance takes a longer time to disconnect its communication than the communication interface with a shorter communication distance. Because it takes time to effect disconnection, there is a problem that power consumption increases. Further, in the case of bringing communication terminals close to each other to conduct communications simultaneously with two communication interfaces working in conjunction with each other, after the communication interface with a longer communication distance becomes ready to communicate, the communication interface with a shorter communication distance is activated to allow communications when the communication terminal enters the communication range of the communication interface with a shorter communication distance. Because the communication interface with a shorter communication distance is activated after entrance into the communication range of the communication interface with a shorter communication distance, there is a problem that it takes time to start communications.

In light of the foregoing, an object of the present invention is to provide a communication terminal with a plurality of different communication means which can efficiently control the activation or disconnection of the communication means, and a communication control method thereof.

Solution to Problem

According to the present invention, there is provided a communication terminal including a plurality of communication means with different communication distances, which includes a presence status detection means that detects a presence status indicating whether a distance of the communication terminal from another communication terminal to communicate with is inside a communication range where communication is possible or outside the communication range where communication is not possible for one communication means among the plurality of communication means, and a communication status management means that causes the other communication means to transition to an activation state, a standby state or a disconnection state in accordance with the presence status detected by the presence status detection means.

According to the present invention, there is provided a communication control method of a communication terminal including a plurality of communication means with different communication distances, which includes a presence status detection step that detects a presence status indicating whether a distance of the communication terminal from another communication terminal to communicate with is inside a communication range where communication is possible or outside the communication range where communication is not possible for one communication means among the plurality of communication means, and a communication status management step that causes the other communication means to transition to an activation state, a standby state or a disconnection state in accordance with the presence status detected by the presence status detection step.

According to the present invention, in accordance with the presence status of any one communication means, the state of the other communication means can be made to transition, thereby enabling efficient control of the activation, disconnection or the like of the communication means.

Further, it is preferred that, when the presence status of one communication means with a shortest communication distance among the plurality of communication means has changed from inside the communication range to outside the communication range, the communication status management means causes the other communication means to transition to the standby state or the disconnection state. The other communication means can be thereby made to transition to the standby state or the disconnection state without waiting until the other communication means moves outside of the communication range and becomes disconnected, which reduces power consumption in the communication means.

Further, it is preferred that, when the presence status of one communication means with a longest communication distance among the plurality of communication means has changed from outside the communication range to inside the communication range, the communication status management means causes the other communication means to transition to the activation state. Therefore, when starting communication with a plurality of communication means working in conjunction with each other, at the point when the communication means with a longest communication distance enters the communication range, the other communication means becomes the activation state in advance, and it is thereby possible to start communication promptly at the point when the other communication means enters the communication range.

Advantageous Effects of Invention

According to the present invention, a communication terminal with a plurality of different communication means can efficiently control the activation or disconnection of the communication means.

DESCRIPTION OF EMBODIMENTS

Hereinafter, a preferred embodiment of a communication system to which a communication terminal according to the present invention is applied will be described in detail with reference to the drawings. Note that, in the embodiment, communications are conducted between the communication terminal according to the present invention and a personal computer by way of illustration.

An overall configuration of a communication system according to the embodiment is described firstly.

Figure 1:
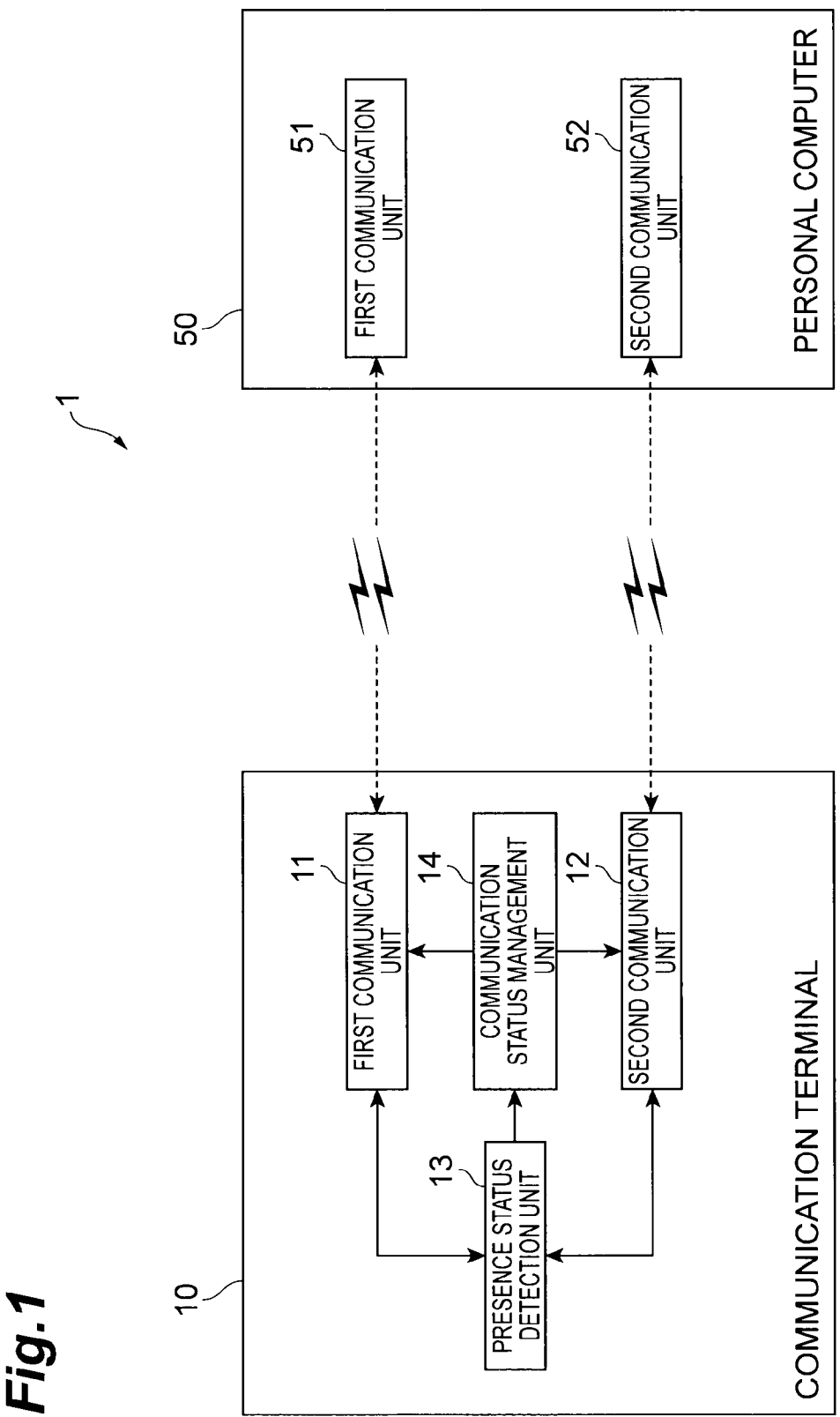
FIG. 1 is a functional block diagram of a communication system.

FIG. 1 is a block diagram showing a functional configuration of a communication system 1. A communication terminal 10 is functionally composed of a first communication unit 11 (communication means) and a second communication unit 12 (communication means) that conduct communications with a personal computer 50, a presence status detection unit 13 (presence status detection means), and a communication status management unit 14 (communication status management means). Note that a communication terminal having a voice call function to which functions of the communication terminal according to the present invention is applied is used as the communication terminal 10 by way of illustration.

The personal computer 50 (another communication terminal) is functionally composed of a first communication unit 51 and a second communication unit 52 that conduct communications with the communication terminal 10.

Figure 2:
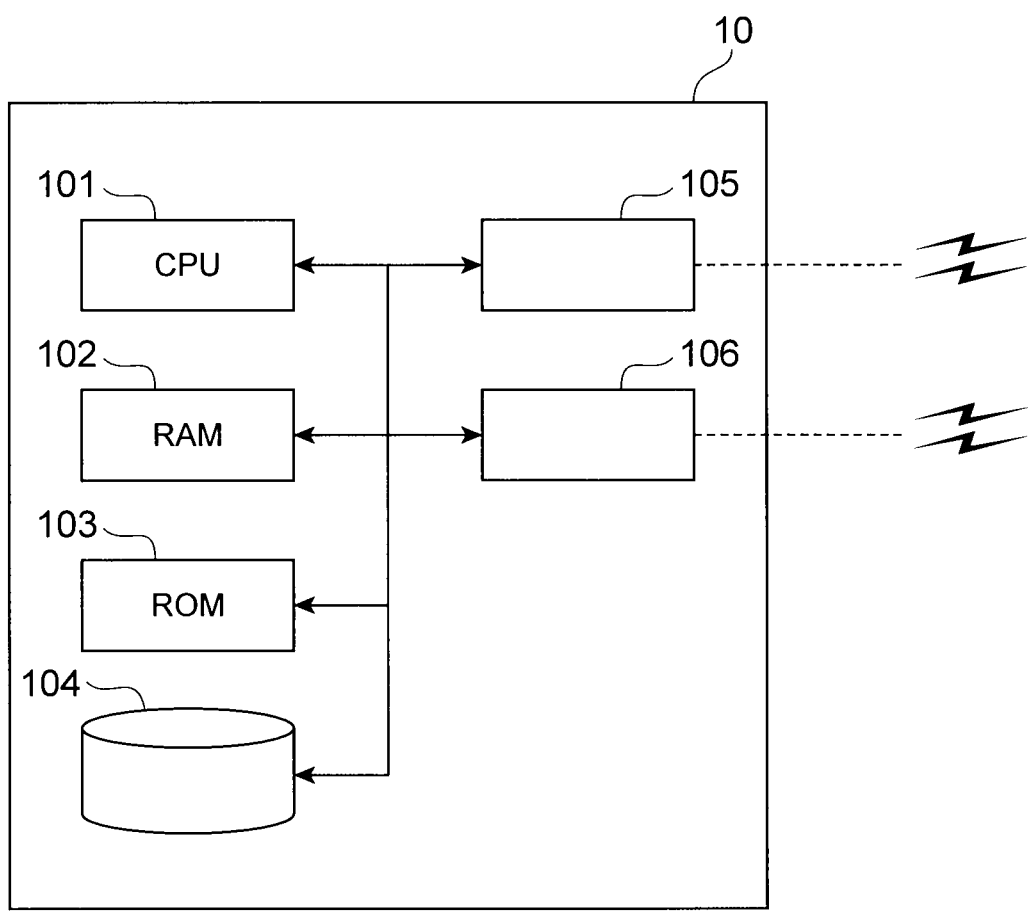
FIG. 2 is a hardware block diagram of a communication terminal.

FIG. 2 is a hardware block diagram of the communication terminal 10. As shown in FIG. 2, the communication terminal 10 is physically configured as a computer system including a CPU 101, a RAM 102 and a ROM 103 serving as a main memory, an auxiliary memory 104 such as a hard disk, a first communication interface 105 and a second communication interface 106, which are data transmitting and receiving devices such as a network card and the like. The functions illustrated in FIG. 1 are implemented by loading given computer software into hardware such as the CPU 101 or the RAM 102 shown in FIG. 2 and thereby making the first communication interface 105 and the second communication interface 106 operate for communications under control of the CPU 101 and further performing reading and writing of data in the RAM 102 and the auxiliary memory 104. Particularly, the function of the first communication unit 11 shown in FIG. 1 is implemented by bringing the first communication interface 105 in FIG. 2 into operation, and the function of the second communication unit 12 shown in FIG. 1 is implemented by bringing the second communication interface 106 in FIG. 2 into operation.

Each functional element is described in detail hereinafter with reference to FIG. 1.

The first communication unit 11 of the communication terminal 10 conducts radio communications with the first communication unit 51 of the personal computer 50. The first communication units 11 and 51 conduct communications using a contactless IC card (e.g. the FeliCa (registered trademark) function). The communication distance in this case is about 10 cm at maximum. Note that it is assumed that the communication terminal 10 and the personal computer 50 transmit and receive accounting information by conducting communications through the FeliCa function between the first communication units 11 and 51. Note that communications conducted between the first communication unit 11 and the first communication unit 51 are referred to hereinafter as the first communication.

The second communication unit 12 of the communication terminal 10 conducts radio communications with the second communication unit 52 of the personal computer 50. The second communication units 12 and 52 conduct communications using the TransferJet (registered trademark) function. The distance of communication in this case is about 3 cm at maximum. The communication terminal 10 and the personal computer 50 transmit and receive data of music or the like, for example, by communications through the TransferJet function conducted between the second communication units 12 and 52. Note that communications conducted between the second communication unit 12 and the second communication unit 52 are referred to hereinafter as the second communication.

The first communication and the second communication make communications in conjunction with each other. A specific example includes the case where processing of payment from the communication terminal 10 to the personal computer 50 by the first communication through the FeliCa function and processing of transmission of music data from the personal computer 50 to the communication terminal 10 by the second communication through the TransferJet function are performed in conjunction with each other.

The presence status detection unit 13 detects, as a presence status, whether the position of the communication terminal 10 is inside the communication range where communication with the personal computer 50 is possible or outside the communication range where communication is not possible for each of the first communication and the second communication. For example, the inside of the communication range is an area where communication between the communication terminal 10 and the personal computer 50 can be established, and the outside of the communication range is an area where communication cannot be established.

The communication status management unit 14 requests the first communication unit 11 and the second communication unit 12 to transition to an activation state, a standby state or a disconnection state based on the presence status detected by the presence status detection unit 13. For example, the activation state includes a so-called warming-up state where the communication function is not stopped so that communication with the other side can occur immediately upon entrance into the communication range. Further, the standby state includes a sleep state and a power saving state, and the disconnection state includes a state where transmission and reception of signals are forcibly terminated.

The personal computer 50 performs transmission and reception of data with the communication terminal 10 by making the first communication and the second communication work in conjunction with each other. For example, when a user brings the communication terminal 10 close to the personal computer 50 and makes payment from the communication terminal 10 to the personal computer 50 by the first communication through the FeliCa function, the personal computer 50 starts transmission of data of music or the like by the second communication through the TransferJet function based on the payment processing. The communication terminal 10 downloads the transmitted data of music or the like by the second communication, thereby acquiring and using the data.

An operation of the communication terminal 10 according to the embodiment is described hereinbelow.

(Communication State→Disconnection State)

In the following, the case where, in the state where the communication terminal 10 and the personal computer 50 are very close to each other and the first communication and the second communication are being conducted, the communication terminal 10 is separated from the personal computer 50 to turn the communications into the disconnection state is described with reference to FIGS. 3 and 4.

Figure 3:
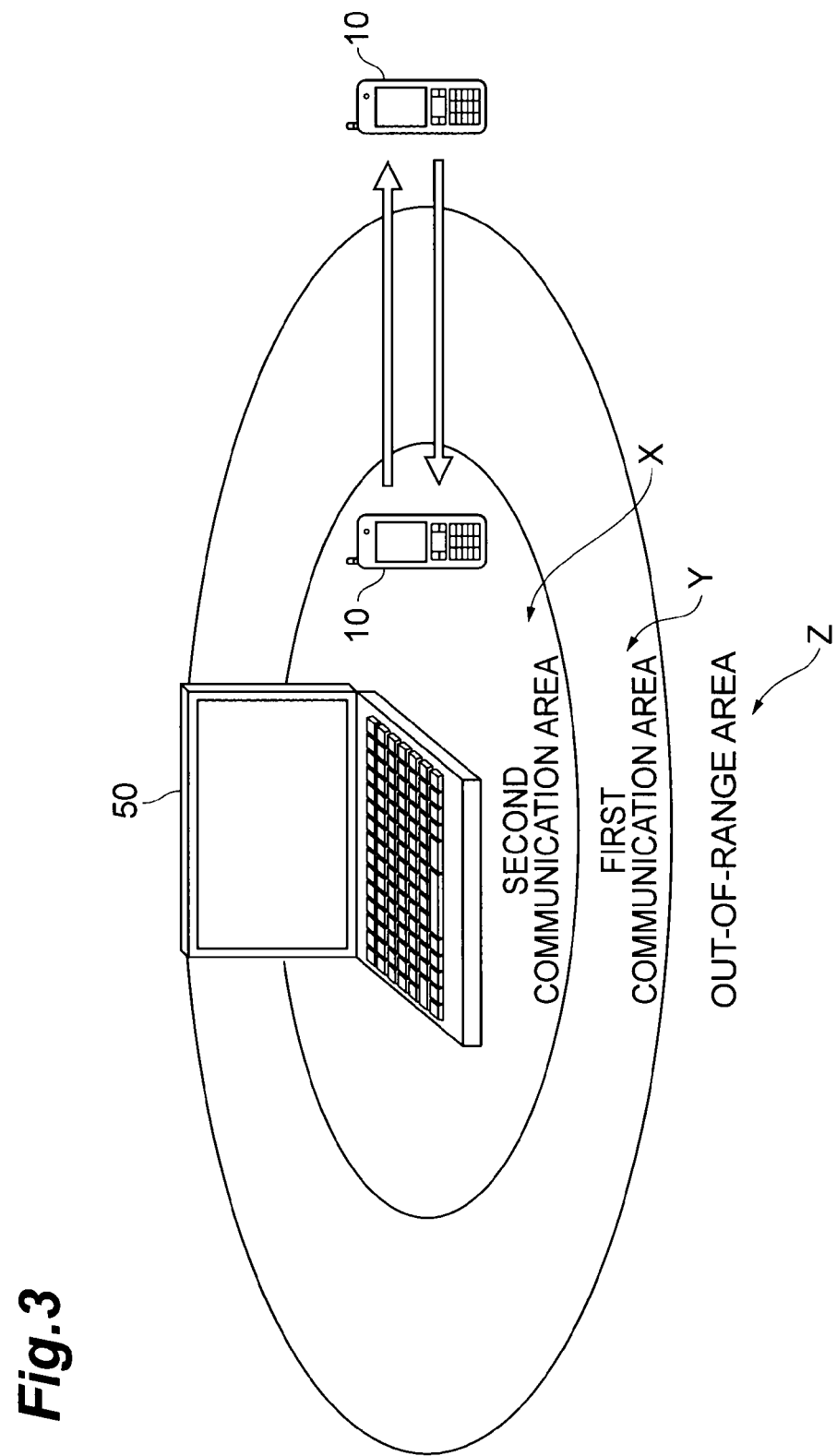
FIG. 3 is a view showing a positional relation between a communication terminal and a communication range.
Figure 4:
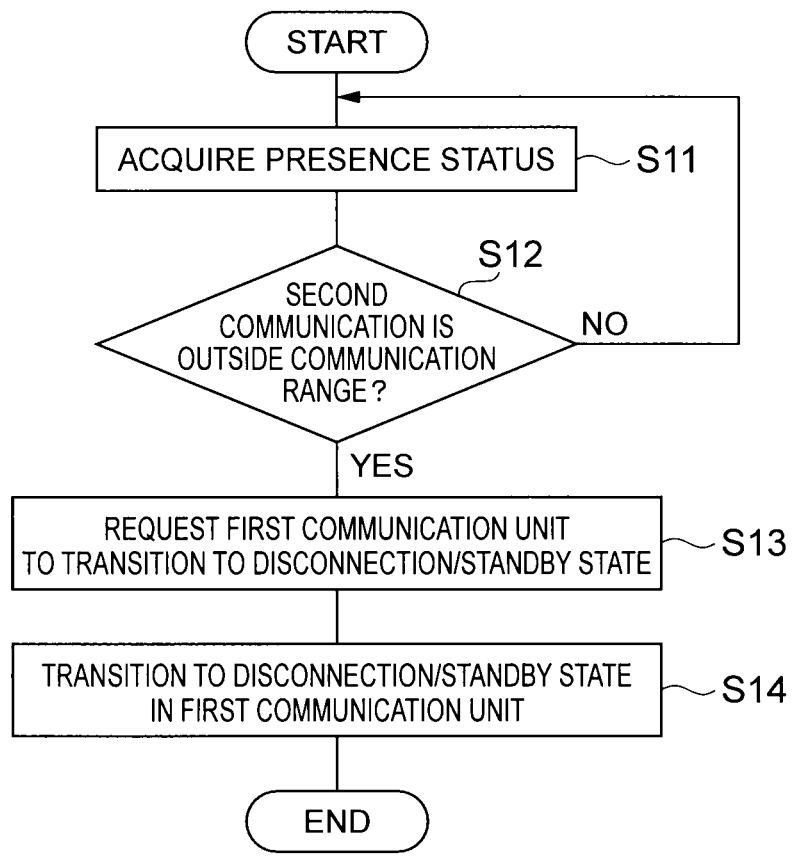
FIG. 4 is a flowchart showing a flow of a process in a communication terminal when the communication terminal is separated from a personal computer.

FIG. 3 is a view showing a relation between the position of the communication terminal 10 and a communication range, and FIG. 4 is a flowchart showing a flow of a process performed in the communication terminal 10. Not that, in FIG. 3, when viewed from the personal computer 50, an area where the second communication through the TransferJet function is possible is referred to as a second communication area X, an area where the first communication through the FeliCa function is possible is referred to as a first communication area Y, and an area where the first communication and the second communication are not possible is referred to as an out-of-range area Z. Further, the flowchart of FIG. 4 begins with the state where the communication terminal 10 is within the second communication area X of FIG. 3.

In Step S11 of FIG. 4, the presence status detection unit 13 acquires whether it is inside the communication range where communication with the personal computer 50 is possible or outside the communication range where communication is not possible for each of the first communication unit 11 and the second communication unit 12 by referring to the status of the first communication unit 11 and the second communication unit 12.

In Step S12, the presence status detection unit 13 determines whether the second communication is outside the communication range (where communication cannot be established) and the first communication is inside the communication range (where communication can be established). When this condition is not satisfied (NO), i.e. when the communication terminal 10 is inside the second communication area X, the process repeats the processing of Steps S11 and S12 until Step S12 is satisfied. On the other hand, when the communication terminal 10 moves to the outside of the second communication area X, the condition of Step S12 is satisfied (YES), and the process proceeds to Step S13. Note that, when the communication terminal 10 moves to the outside of the second communication area X, the second communication becomes unable to be established, and the second communication unit 12 of the communication terminal 10 enters the disconnection state.

In Step S13, the communication status management unit 14 requests the first communication unit 11 to transition to the disconnection state or the standby state. Receiving the request from the communication status management unit 14, the first communication unit 11 transitions to the disconnection state or the standby state in Step S14. As a result, when the communication terminal 10 moves to the outside of the second communication area X, both of the first communication unit 11 and the second communication unit 12 enter the disconnection state or the standby state.

As described above, on occasion when a user separates the communication terminal 10 from the personal computer 50 with an intention to disconnect the first communication and the second communication, at the point when the communication terminal 10 moves to the outside of the second communication area X with a shorter communication distance, the second communication unit 12 enters the disconnection state, and further the first communication unit 11 is made to transition from the activation state to the disconnection state or the standby state. Therefore, the first communication unit 11 with a longer communication distance also transitions to the disconnection state or the standby state at the point when the first communication and the second communication become unable to make communications in conjunction with each other without waiting until the communication terminal 10 moves to the outside of the first communication area Y, thus reducing the power consumption in the first communication unit 11.

(Disconnection State→Communication State)

Figure 5:
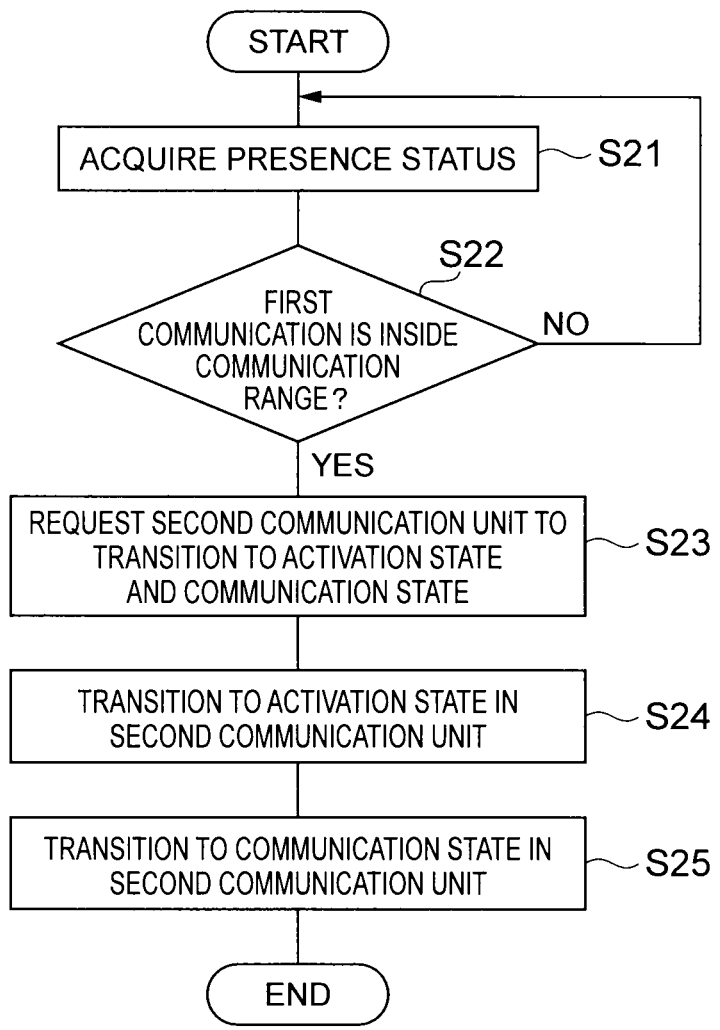
FIG. 5 is a flowchart showing a flow of a process in a communication terminal when the communication terminal is brought close to a personal computer.

Next, the case where the communication terminal 10 is gradually brought close to the personal computer 50 to turn the first communication and the second communication into the communication state is described with reference to FIGS. 3 and 5. FIG. 5 is a flowchart showing a flow of a process performed in the communication terminal 10. Note that the flowchart of FIG. 5 begins with the state where the communication terminal 10 is within the out-of-range area Z of FIG. 3.

In Step S21 of FIG. 5, the presence status detection unit 13 acquires whether it is inside the communication range where communication with the personal computer 50 is possible or outside the communication range where communication is not possible for each of the first communication unit 11 and the second communication unit 12 by referring to the status of the first communication unit 11 and the second communication unit 12.

In Step S22, the presence status detection unit 13 determines whether the first communication is inside the communication range (where communication can be established) and the second communication is outside the communication range (where communication cannot be established). When this condition is not satisfied (NO), i.e. when the communication terminal 10 is inside the out-of-range area Z, the process repeats the processing of Steps S21 and S22 until Step S22 is satisfied. On the other hand, when the communication terminal 10 moves to the inside of the first communication area Y, the condition of Step S22 is satisfied (YES), and the process proceeds to Step S23. Note that, when the communication terminal 10 moves to the inside of the first communication area Y, the first communication becomes available, and the first communication unit 11 of the communication terminal 10 is activated, so that the first communication unit 11 and the first communication unit 51 of the personal computer 50 become possible to communicate with each other.

In Step S23, the communication status management unit 14 requests the second communication unit 12 to transition to the activation state and to transition to the communication state with the second communication unit 52 of the personal computer 50. Receiving the request from the communication status management unit 14, the second communication unit 12 transitions to the activation state in Step S24 and enters the wait state for communication with the second communication unit 52 of the personal computer 50. When the communication terminal 10 comes to the inside of the second communication area X and the second communication becomes available to be established, the second communication unit 12 transitions to the communication state with the second communication unit 52 of the personal computer 50 in Step S25.

As described above, on occasion when a user brings the communication terminal 10 close to the personal computer 50 with an intention to connect the first communication and the second communication, at the point when the communication terminal 10 moves to the inside of the first communication area Y with a longer communication distance, the second communication unit 12 can be made to transition to the activation state in advance. It is thereby possible to bring the second communication to transition to the communication state promptly at the point when the communication terminal 10 has moved into the second communication area X, thus reducing the time to start communication, thereby improving the convenience of users.

In this embodiment, as described above, based on the presence status of one of the first communication unit 11 and the second communication unit 12, the other communication unit is made to transition to the activation state, the standby state or the disconnection state, thereby enabling efficient control of the communication unit such as reduction of power consumption and prompt transition of the communication unit to the communication state.

Note that, although the case of using two communication interfaces is described in the above embodiment, three or more communication interfaces may be used. Further, although communications using the FeliCa function and communications using the TransferJet function are described as examples of the first communication and the second communication, respectively, the type of the communication function is not limited thereto, and Bluetooth may be used, for example. Further, although the communication terminal according to the present invention is applied to a communication terminal having a voice call function by way of illustration, it may be applied to other terminals. Further, although the personal computer 50 is used in the description as the other end to communicate with the communication terminal 10, it is not limited thereto.

REFERENCE SIGNS LIST

1 . . . Communication system, 10 . . . Communication terminal, 11 . . . First communication unit, 12 . . . Second communication unit, 13 . . . Presence status detection unit, 14 . . . Communication status management unit, 50 . . . Personal computer

The invention claimed is:

1. A communication terminal including a plurality of communication interfaces with different communication distances, comprising:
    circuitry configured to
        detect a presence status indicating whether a distance of the communication terminal from another communication terminal to communicate with is inside a communication range where communication is possible or outside the communication range where communication is not possible for one communication interface among the plurality of communication interfaces; and
        cause the other communication interface means to transition to an activation state, a standby state or a disconnection state in accordance with the presence status, wherein
    when the presence status of one communication interface with a shortest communication distance among the plurality of communication interfaces has changed from inside the communication range to outside the communication range, the circuitry is configured to cause the other communication interface to transition to the standby state or the disconnection state.

2. A communication control method of a communication terminal including a plurality of communication interfaces with different communication distances, comprising:
    detecting a presence status indicating whether a distance of the communication terminal from another communication terminal to communicate with is inside a communication range where communication is possible or outside the communication range where communication is not possible for one communication interface among the plurality of communication interfaces;
    causing the other communication interface to transition to an activation state, a standby state or a disconnection state in accordance with the presence status; and
    causing, when the presence status of one communication interface with a shortest communication distance among the plurality of communication interfaces has changed from inside the communication range to outside the communication range, the other communication interface to transition to the standby state or the disconnection state.

* * * * *